Jan. 15, 1935.                    E. KIRCH                    1,988,279
                    TERMINAL AND JOINT FOR ELECTRIC CABLES
                            Filed Feb. 21, 1933
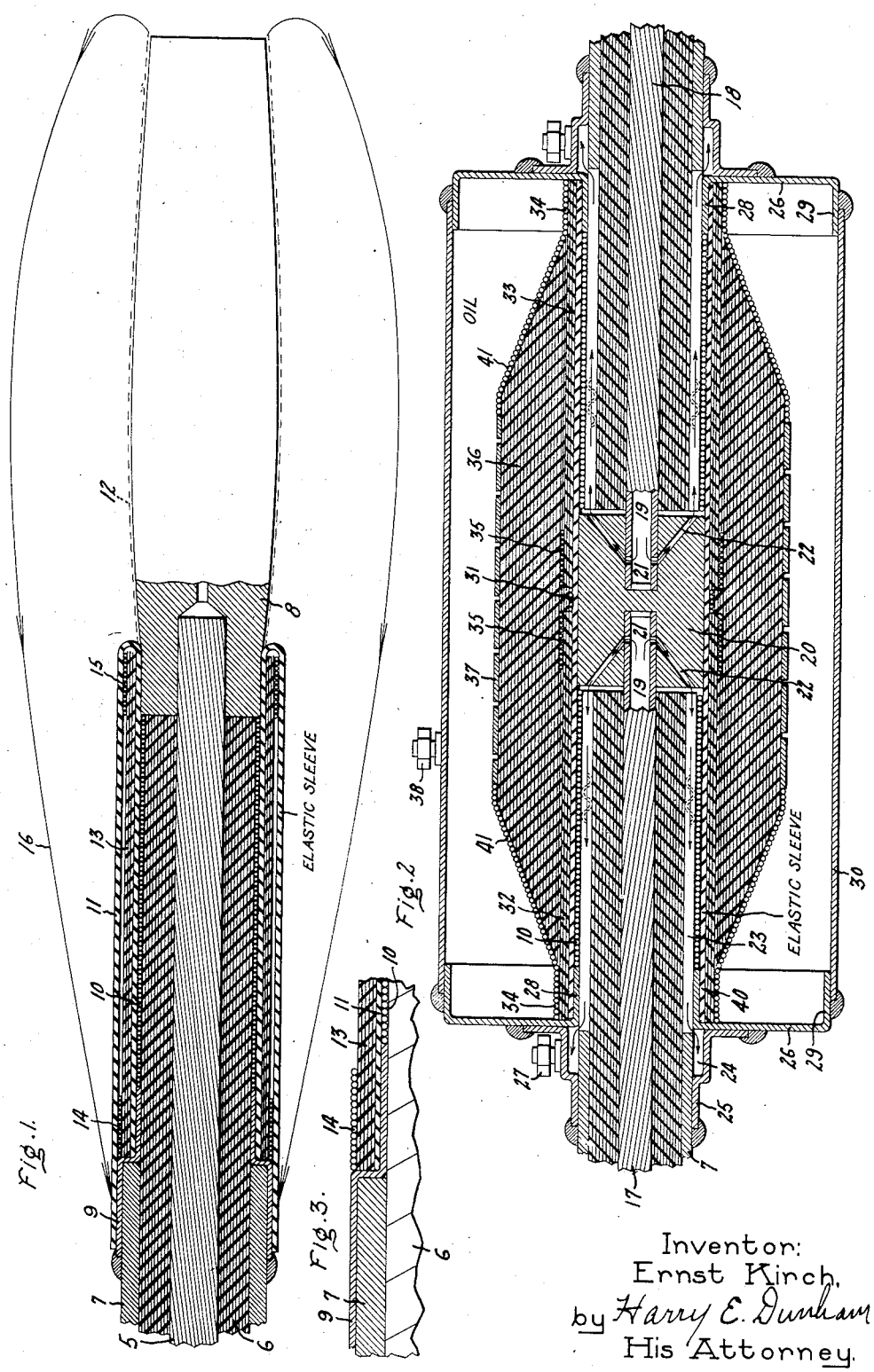
Inventor:
Ernst Kirch,
by Harry E. Dunham
His Attorney.

Patented Jan. 15, 1935

1,988,279

UNITED STATES PATENT OFFICE 1,988,279

TERMINAL AND JOINT FOR ELECTRIC CABLES

Ernst Kirch, Berlin-Oberschoneweide, Germany, assignor to General Electric Company, a corporation of New York Application February 21, 1933, Serial No. 657,871
In Germany March 2, 1932

7 Claims. (Cl. 173—268)

The present invention relates to terminals and joints for electric cables and especially to power cables carrying currents of high potential. The object of my invention is to improve the construction of such devices to the end that they are more reliable in service and at the same time simple in construction and less expensive to install.

For a consideration of what I believe to be novel and my invention, attention is directed to the accompanying description and the claims appended thereto.

In the attached drawing which is illustrative of my invention, Fig. 1 is a sectional view of a cable terminal; Fig. 2 is a longitudinal view of a fluid stop joint, and Fig. 3 is a detail view.

5 indicates a stranded electric conductor, solid or hollow, which is surrounded by a body 6 of factory applied insulation of any approved form such as paper, for example, arranged in layers. Enclosing the conductor and its insulation is a sheath 7 of lead or other suitable material. To the end of the conductor is soldered or otherwise secured a terminal or connector member 8, usually of cylindrical shape and having a socket to receive the strands of the conductor. Its length and shape will vary to suit the requirements. The insulation on the conductor is or may be cut to form a shouldered end and the inner end of the terminal member is seated thereon. The sheath is cut back for a substantial distance from the end of the conductor, and surrounding the cut end and the adjacent exposed insulation for a portion of its length is a metal thimble 9, one part of which snugly fits the sheath and the other part of smaller diameter the insulation 6. Surrounding the conductor insulation 6 is a wrapping 10 of soft cord or other insulating material which fills any inequalities up to the diameter of the small end of the thimble. Having thus formed a suitable bed, an elastic sleeve or stocking 11 is drawn on over the terminal member and exposed insulation and sealed to the small end of the thimble. The sleeve is sufficiently elastic to cause it to snugly fit over the parts enclosed thereby. Because the sleeve is subjected to the action of the fluid insulation, such as oil, with which the cable is impregnated, it should be of a material which is not adversely affected by said fluid and one which retains its elastic or flexible nature. To meet this condition, the sleeve may be made, for example, of synthetic insulating materials made from compounds of acrylic acid or its homologues, including polymerized products of such compounds, or from polymerized vinyl compounds particularly the polymerized vinyl acetates. The former type of material is described, for example, in British patent to Rohm No. 613 of 1913 and a suitable product for use in connection with the present invention may be obtained from Rohm and Haas, Darmstadt, Germany. Polymerized vinyl compounds are well known in the art. See, for example, the publication "Synthetic Resins and Their Plastics" by Carlton Ellis (The Chemical Catalog, Inc., 1923) Chapter 18, pages 300–306. This latter type of material may be obtained in a form suitable for the purposes of the present invention from the firm of Wacker, Munich, Germany. Analogous materials may also be used. As an alternative the sleeve may be made of rubber and made oil-resistant by coatings of the aforesaid materials. At this stage of the assembly, one end of the sleeve projects to the right as indicated by the dotted lines 12. Because the sleeve is elastic it is necessary to prevent it from being enlarged due to increase of pressure of the impregnating fluid when heated. For this purpose there is placed over the left hand end of the tube a cylindrical bandage 13 which may be in the form of material wrapped on layer-by-layer or it may be made as a separate preformed tube and slipped endwise into place. A suitable material for the purpose is that known as presspahn which has a cellulose base and is compressed so as to have a firm body. The bandage is held in position by suitable means, as for example, by a wrapping 14 of numerous turns of wire which are held in place by solder or equivalent means. One of these binding bands or wrappings is shown on an enlarged scale in Fig. 3. The second band 15 is similarly constructed and binds the right hand end of the bandage 13 firmly on the adjacent end of the terminal member 8. As the sleeve 11 is between the bandage and the member 8 at this point, it also is firmly bound in place. After the binding operation, the right hand end of the tube is pulled or turned back over the bandage in the manner indicated by the lines 16 and the arrows thereon. The end of the sleeve overlying the large end of the metal thimble is then cemented or otherwise fastened thereto. When this is done, the bandage of presspaper is completely enclosed by an impervious covering so that leakage of liquid from the conductor outwardly or from the outside inwardly is prevented. The terminal is then enclosed in an insulating enclosure as is customary for terminals.

The paper or other factory applied insulation on the conductor is impregnated with oil or equivalent liquid and the spaces between strands of the conductor are also filled with the same liquid. As the liquid heats, due to heating of the cable, it expands and the pressure thereof may amount to many atmospheres. The fluid is confined by the flexible sleeve which in turn is reinforced by the bandage 13 and the binding bands 14 and 15. If it be desired that the cable end be flexible, the reinforcement instead of being rigid may be formed by winding relatively narrow strips of presspahn, one at a time, until the desired diameter is obtained. The bandage may be made of paper and may or may not be previously treated or impregnated. It may be made as a single tube or of two or more concentric tubes cemented together. As previously stated, the bandage is securely held in place, and as one illustration binding bands of wire have been mentioned but other forms of clamps or bands may be used.

In Fig. 2 is illustrated my improved form of stop joint. 17 and 18 indicate two conductors, each having a hollow central core or channel 19. The adjacent ends of the conductors are soldered or otherwise secured to the connector member 20 and the arrangement is such that flow of fluid insulation from the core of one conductor to that of the other is prevented. Each conductor has laterally opening ports 21 which communicate with diagonally extending passages 22 in the connector. The lead sheath 7 is stripped off of each cable end for a limited distance to expose the factory applied insulation on the conductor. In the space thus formed is located a filling of corrugated paper or equivalent material 23 which forms one or a series of longitudinal channels for the oil contained in the cable core. Each channel is of small cross-section to increase the dielectric strength of the structure as a whole. Over the corrugated paper 23 a winding of cord such as 10 of Fig. 3 may be applied to assist in defining the small fluid passages. At the outer ends, the channels each communicate with an annular chamber 24 formed in an end head 25 which is wipe soldered to the sheath and also to an end member or head 26 of the joint enclosing casing. Oil or other insulating liquid is fed into and received from the chamber 24 through a suitable fitting 27. In service, the fitting is connected to a liquid containing reservoir. The heads 26 are of cup shaped form, each having a hub-like central part 28 and a peripheral flange 29, the latter forming a support for the cylindrical casing 30. The part 28, like the thimble 9, serves as a support for one end of the elastic sleeve and its bandage.

Extending longitudinally between the hub-like member 28 and over the oil channels in the parts 23 is an elastic sleeve or stocking 40 of oil resisting material of the character previously described. The ends of the sleeve are cemented to the end members 28, and in the center the sleeve is bound around the connector by the binding band or clamp 31. Because of the impervious character of the sleeve 40, oil is prevented from passing from one cable channel to another or through the insulation into the interior of the casing. Outside of the sleeve are located two bandages 32 and 33, one on each side of the central binding band 31. Each of these is in turn held or clamped in place over the sleeve 40 by binding bands 34 and 35 located at opposite ends. Over the bandages 32 and 33 is applied a reinforcement 36 made of insulating tape applied layer by layer. Over the tape is wrapped a metal electrostatic shielding tape 37 either stranded or solid and at its ends is connected to the binding wires 41 which are grounded on the heads 26 that have the same potential as the cable sheaths. In assembling the joint, first one end and then the other is worked on. Because the sleeve is elastic, it can be rolled back out of the way to permit soldering of the connector to the conductors and the other necessary operations. The end heads are secured in position after the corrugated paper 23 is wound or otherwise located in place and any covering such as twine 10 applied thereto. The joint casing is provided with a fitting 38 by means of which it is maintained filled with oil at all times.

For simplicity of illustration my invention has been shown in connection with single conductor cables but it may be utilized with those having more than a single conductor.

Because the sleeve is impervious to fluid, is elastic and can be readily pulled into place by hand, it affords a simple means for effectively preventing the flow or even migration of fluid from one part or portion to another. Its use also reduces the time and labor involved in assembling the parts in place. This is of particular importance in connection with joints which commonly have to be made in manholes below the level of the streets.

What I claim as new and desire to secure by Letters Patent of the United States, is:—

1. In combination, a conductor, fluid impregnated insulation thereon, an enclosing metal sheath therefor, a metallic member connected to one end of the conductor, an impervious elastic sleeve which is resistant to the impregnating fluid, surrounding the insulation on the conductor and sealed at its ends to the sheath and to the member, and means surrounding the sleeve to prevent enlargement thereof when the impregnating fluid expands due to heat.

2. In combination, a conductor, fluid impregnated insulation thereon, an enclosing metal sheath therefor, a metallic member connected to one end of the conductor, an impervious elastic sleeve which is resistant to the impregnating fluid, surrounding the insulation on the conductor and sealed at its ends to the sheath and the member, a reinforcing bandage for the sleeve to prevent enlargement thereof, and means for clamping the bandage in place.

3. The combination of a conductor, fluid impregnated insulation thereon, an enclosing metal sheath therefor which is cut back from one end to expose the insulation, a metallic member connected to one end of the conductor, a thimble sealed to the sheath, a unitary elastic sleeve which is impervious to the impregnating fluid and surrounds the insulation, said sleeve being sealed at its ends to the thimble and member, and reinforcing means for the sleeve to prevent enlargement thereof when the impregnating fluid expands due to heat.

4. The combination of a conductor, fluid impregnated insulation thereon, an enclosing metal sheath therefor which is cut back at one end to expose the insulation, a metallic member connected to one end of the conductor, a unitary elastic sleeve surrounding the insulation and also a part of the member, said sleeve being sealed to the sheath at one end, a body of insulation reinforcing the sleeve and extending partly over the member, and a means for binding the sleeve and reinforcing body around the member.

5. The combination of a pair of conductors, each having a channel for liquid insulation, factory applied insulation on the conductors, sheaths for the conductors which are cut back from their adjacent ends, a connector for electrically uniting the cable ends and preventing the flow of insulation between channels, bodies of insulation surrounding the factory applied insulation on the conductor ends, each having a relatively long restricted passage for liquid, said passage communicating with a channel at its inner end, an elastic, impervious sleeve surrounding said bodies and the connector and sealed at its ends against escape of fluid, a reinforcing means surrounding the sleeve, a body of insulation surrounding the reinforcing means, and an enclosing casing.

6. In the combination of a conductor, fluid impregnated insulation thereon, an enclosing metal sheath therefor, a metal member secured to one end of the conductor, a thimble united with the sheath, a unitary sleeve of elastic material which is impervious to the impregnating fluid and surrounds the exposed insulation of the conductor, means for securing one end of the sleeve to the thimble, and means for securing the other end of the sleeve to the member.

7. In the combination of a pair of insulated cables, sheaths therefor, said sheaths being cut away to expose the insulation, impregnating liquid within the sheaths, a connector for electrically uniting the adjacent ends of the cables, a unitary elastic sleeve surrounding the exposed insulation on both cable ends and also the connector, said sleeve being impervious to the impregnating fluid within the sheaths, and means for fastening the sleeve in place to prevent transfer of impregnating liquid from one cable to the other.

ERNST KIRCH.